United States Patent [19]
Woltron et al.

[11] Patent Number: 4,696,459
[45] Date of Patent: Sep. 29, 1987

[54] PLASTIC LEAF SPRING WITH AT LEAST ONE SPRING-EYE BODY OR SPRING-EYE SECTION

[75] Inventors: Herbert Woltron, Moedling; Christian Huber, Eisenstadt, both of Austria

[73] Assignee: Isoport Verbundbauteile Ges. m.b.H., Austria

[21] Appl. No.: 793,694

[22] PCT Filed: Mar. 1, 1985

[86] PCT No.: PCT/EP85/00075
§ 371 Date: Oct. 16, 1985
§ 102(e) Date: Oct. 16, 1985

[87] PCT Pub. No.: WO85/03988
PCT Pub. Date: Sep. 12, 1985

[30] Foreign Application Priority Data
Mar. 2, 1984 [AU] Australia .................. 711/84

[51] Int. Cl.⁴ .......... B60G 11/12; F16F 1/28
[52] U.S. Cl. ................... 267/36.1; 267/149
[58] Field of Search ........ 267/47, 54 R, 54 A, 267/54 B, 54 C, 54 D, 54 E, 55, 56, 148, 149, 158

[56] References Cited
U.S. PATENT DOCUMENTS
3,968,958 7/1976 Huchette et al. ............ 267/149 X
4,475,723 10/1984 Meyer ...................... 267/149 X FOREIGN PATENT DOCUMENTS
132074 1/1985 European Pat. Off. .
58-94648 6/1983 Japan ..................... 267/148
2021731 12/1979 United Kingdom ........ 267/149

OTHER PUBLICATIONS
*Patent Abstracts of Japan*, vol. 8, No. 2, (M–266), (1439), Jan. 7, 1984.

*Primary Examiner*—Douglas C. Butler
*Attorney, Agent, or Firm*—Bierman and Muserlian

[57] ABSTRACT

A plastic leaf spring with spring-eyes at the spring-ends has a spring-eye section (1) or a spring-eye body (15, 28) of fiber-reinforced plastic, with the spring-eye section (1) integrated in the leaf spring body or the spring-eye body (15, 28) manufactured separately from it. The spring-eye section (1) or spring-eye body (15, 28) each contain a layer (2, 16, 29) of essentially constant thickness with a center section (4, 18, 31) wrapping the spring-eye opening, and two connecting sections (3, 17, 32) appropriately essentially parallel to each other, with the outside surface of the layer (2, 16, 29) forming a hollow groove (13, 24, 33) at least one transition between the center section (4, 18, 31) and the connecting sections (3, 17, 32). The strength of the plastic leaf spring according to the invention is substantially increased through appropriately plate-shaped reinforcing elements (11, 22, 34) form-locking and/or frictionally connected to each other, which at the outside adjoin the connecting sections (3, 17, 32) under pressure, and of which at least one touches the layer-surface also at a hollow groove (13, 24, 33).

8 Claims, 6 Drawing Figures

Fig. 3
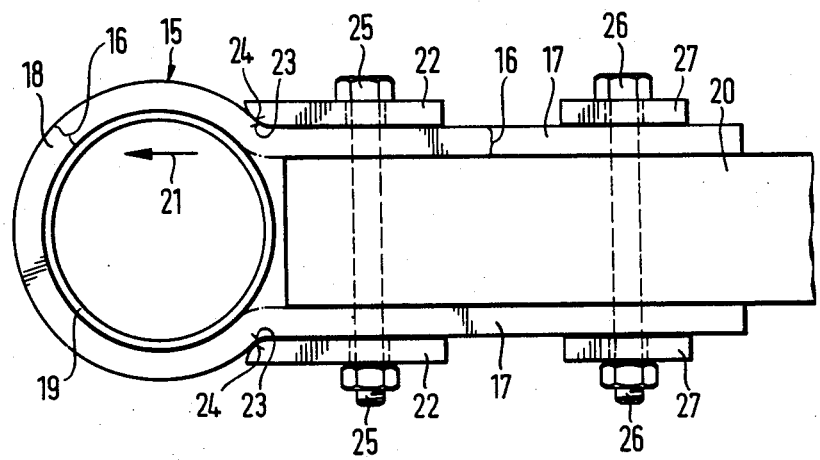
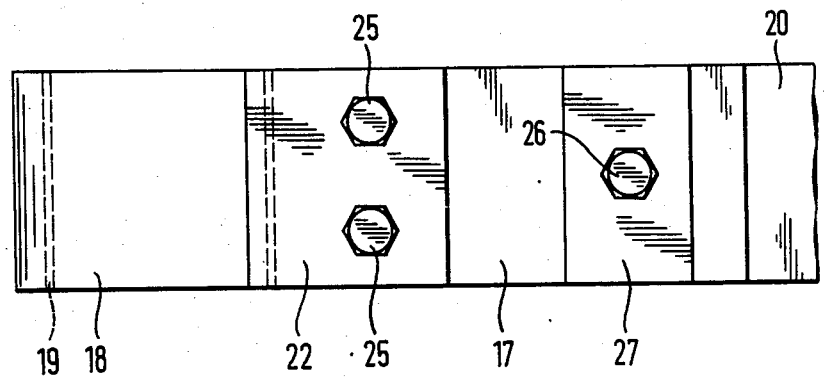
Fig. 4

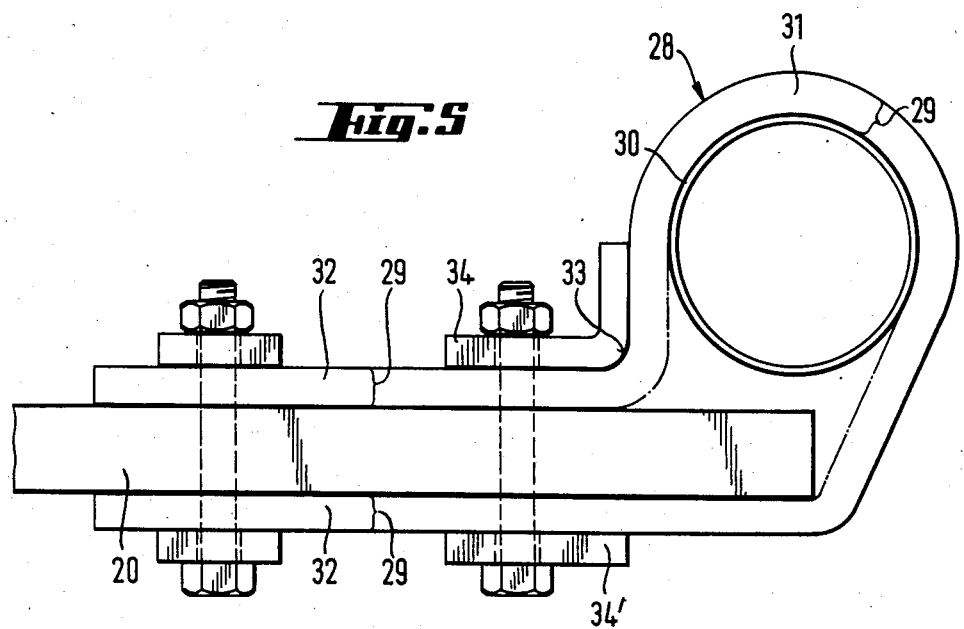
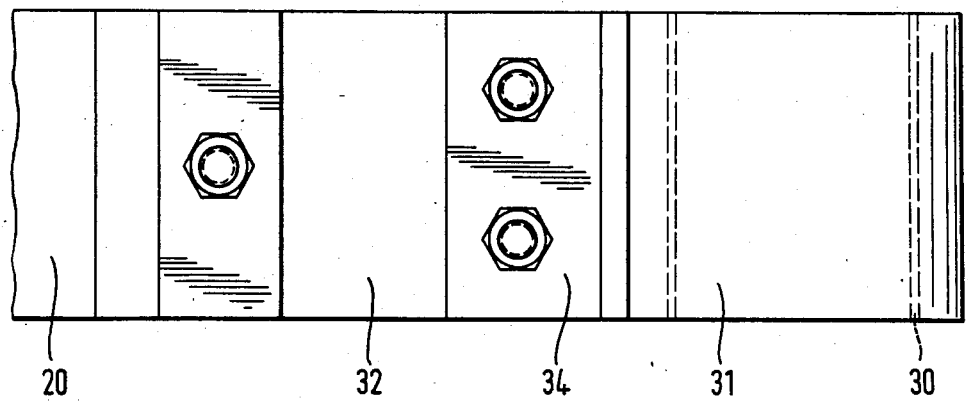

PLASTIC LEAF SPRING WITH AT LEAST ONE SPRING-EYE BODY OR SPRING-EYE SECTION

BACKGROUND OF THE INVENTION

The invention concerns a plastic leaf spring with at least one spring-eye section or spring-eye body arranged at one of the spring ends, containing a layer of substantially constant thickness, with a center section wrapped around the spring-eye opening, and two connecting sections appropriately parallel to each other, with the latter appropriately forming at least part of the spring end, and with the outside surface of the layer forming a hollow groove at at least one transition between its center section and its end sections.

STATE OF THE PRIOR ART

A plastic leaf spring of this type is known from U.S. Pat. No. 3,968,958. To manufacture these springs, one starts with a thin strip consisting of non-woven glass fiber material and a soft matrix resin on an epoxy resin basis. Blanks of such a strip are placed in a mold in several plies, one above the other, and joined under pressure and at a raised temperature under cure hardening of the matrix resin to produce the finished leaf spring. FIGS. 6 and 15 of this U.S. Pat. No. 3,968,958 relate to plastic leaf springs manufactured according to this method, in which the spring-eyes are integrated in the spring body. The thusly constructed plastic leaf springs have only a low tensile strength in the direction perpendicular to the surfaces of the strip blanks that serve to construct the leaf spring, because the springs have no reinforcing fibers running in this direction. As the applicant has found, this has in many instances the effect that when an overstrain is introduced through the spring-eyes, which has an essential component also in the direction parallel to the longitudinal extension of the spring, the leaf spring will tear directly at a spring-eye in the midpoint of the spring.

SUMMARY OF THE INVENTION

The objective of the invention is to improve a plastic leaf spring of the above mentioned type with the construction and dimensioning otherwise remaining the same, in such a manner that the strength of the spring as determined by a tensile test in which the tensile force introduced through the spring-eyes essentially acts in the longitudinal extension of the spring, will be increased considerably.

The problem assigned to the invention is solved by the plastic leaf spring according to the invention in that two reinforcing elements are provided, appropriately plate-shaped, which outwardly abut under pressure the two connecting sections of the layer of the spring-eye section or spring-eye body wrapping the spring-eye opening, with at least one thereby touching the layer surface at a hollow groove, and which elements are form-locking and/or frictionally connected to each other.

At least one of the reinforcing elements advantageously closely joins with a rounded off edge the connecting hollow groove of the layer-surface.

According to an advantageous embodiment of the leaf spring according to the invention, the reinforcing elements are connected by bolts to each other and to the spring end.

According to a further embodiment of the invention, the leaf spring pursuant to the invention is characterized in that the spring-eye section and the plastic leaf spring are constructed in one piece. Advantageously, the two connecting sections of the spring-eye section wrapping the spring-eye opening are joined to each other, and thereby form at least one part of the plate-shaped spring end.

In another advantageous embodiment of the leaf spring according to the invention, it is characterized in that the spring-eye body is manufactured as a body separate from the leaf spring body, which is joined to the spring end. Advantageously, the two connecting sections of the layer of the spring-eye body wrapping the spring-eye opening abut the two flat sides of the spring end, and are connected to the spring end together with the reinforcing elements.

BRIEF DESCRIPTION OF DRAWINGS

FIGS. 3–4 represent vertical and plan views of the end of a plastic spring provided with a spring eye.

FIGS. 5–6 show a modification of FIGS. 3–4 in vertical and plan view.

DETAILED DESCRIPTION

Figure 1:
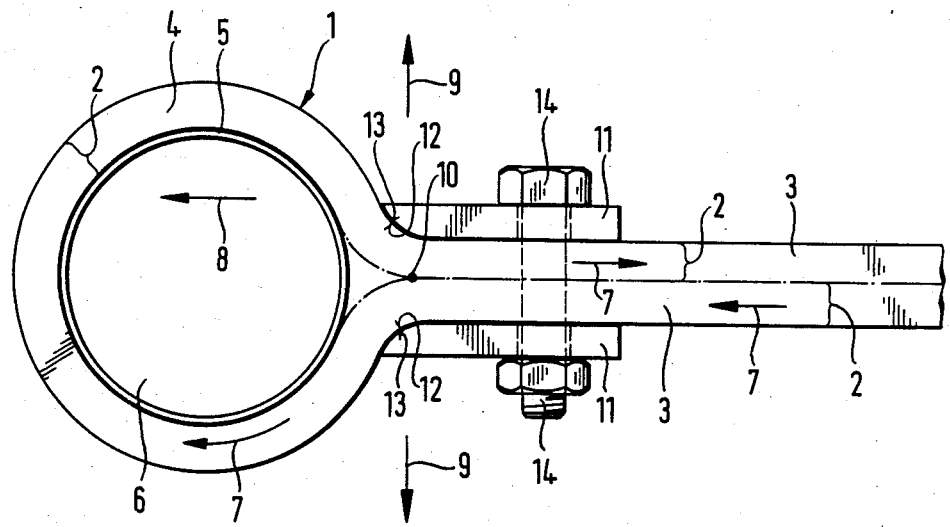
FIGS. 1 and 2 show schematically in vertical and plan view, respectively, the spring-eye section 1 at the end of a leaf spring of fiber-reinforced plastic, e.g., of glass-fiber reinforced epoxy resin.

This spring-eye section 1 of the plastic spring body of FIG. 1 has a layer 2 of essentially constant thickness, with two connecting sections 3 parallel and connected with each other, and a center section 4 which wraps a spring-eye bushing 5. The spring-eye bushing 5, which may advantageously also be made of a fiber-reinforced plastic or also of metal, surrounds the spring-eye opening 6. In the layer 2, the largest part of the reinforcing fibers, e.g., in the form of fiber rovings, runs in the direction of arrows 7, i.e., in the longitudinal extension of layer 2.

According to the invention, mechanical reinforcing elements are mounted on the spring-eye section 1, which substantially increase the breaking load of the leaf spring at a tension load in the direction of arrow 8. Without such reinforcing elements, the leaf spring usually breaks in the spring-eye section 1 because at such a tensile load at the transition from the center section 4 to the two connecting sections 3, the latter are pulled apart in the direction of arrows 9 until the spring-eye section 1 tears at location 10 when the said tensile load is reached. This is counteracted by means of the reinforcing elements 11 mounted according to the invention.

The reinforcing elements 11 consist of steel plates which on the outside abut the two connecting sections of layer 2; each of them has a rounded off edge 12, by which they adjoin closely the hollow grooves 13 at the transition between center section 4 and the two connecting sections 3 of layer 2. The two plate-shaped reinforcing elements 11 are connected to each other and to the spring end section 1 by means of two screw bolts 14, which pass through appropriate boreholes in the reinforcing elements 11 and the spring end section 1. By tightening the screw bolts 14 to a specified torque, the two reinforcing elements are pressed against the two connecting sections 3 of layer 2 and the adjacent two hollow grooves 13. The spring end section 1 is thereby mechanically supported at location 10, at which such leaf springs usually break during tension tests.

FIGS. 3 and 4 schematically represent in vertical and plan view, the end of a plastic leaf spring provided with spring-eye, in which a spring-eye body 15 of fiber-reinforced plastic, e.g., glass-fiber reinforced epoxy resin, is manufactured separately from the leaf spring body. The spring-eye body 15 has a layer 16 of essentially constant thickness, with two connecting sections 17, parallel to each other, and a center section 18 which wraps around a metal spring-eye bushing 19. The two connecting sections 17 form mounting cheeks which adjoin the two front sides of the leaf spring end-section 20.

For the manufacture of the spring-eye body 15, e.g., lengths of glass fabric, impregnated with an epoxy resin setting agent mixture, is placed while still set into a mold together with the spring-eye bushing 19, and cured in it at a raised temperature.

To construct the layer 16, several superimposed, resin-impregnated lengths of fabric are used, each extending over the entire length of the layer. This spring-eye body 15 could now be attached in the usual manner through bolts passing through boreholes arranged in the two connecting sections 17 of layer 16 and in the leaf spring end-section 20.

Figure 2:
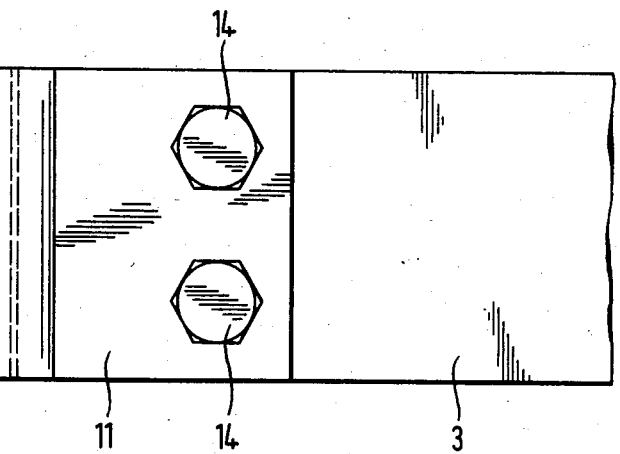

The tensile strength of such a spring-eye body is then determined by a tension test—analogous to the tensile strength of the leaf spring described with the aid of FIGS. 1 and 2. In this test, the spring-eye held by a bolt is subjected to a tensile load and the breaking load is determined. According to the invention, this breaking load can be increased several times over by the affixing of the mechanical reinforcing elements 22.

These two reinforcing elements are made of steel, are plate-shaped and adjoin the two outer front-sides of the two connecting sections 17, with their rounded-off edge 23 closely adjoining the hollow grooves 24 at the transition between the center section 18 and the two connecting sections 17.

The attaching of the reinforcing elements 22 is effected by two screw bolts 25, tightened to a specified torque, which pass through appropriate bore holes in the reinforcing elements 22, in the two connecting sections 17 and in the leaf spring body's end-section 20, and thereby join these parts together. As an additional fastener, a further screw bolt 26 is provided, arranged in borings in the leaf spring body's end-section 20 and in the connecting sections 17, which, in the vicinity of the end of connecting sections 17 presses the latter against the leaf spring end-section 20 by way of the clamps 27 made of steel.

In an actually constructed spring-eye body 60 mm in width and with the layer 16 being 6 mm thick, a breaking load of 26 kN was measured without the described reinforcing elements 22, while with these reinforcing elements a breaking load of 80 kN was measured.

Lastly, in FIGS. 5 and 6, a variant of the spring-eye body illustrated with the aid of FIGS. 3 and 4 is described in vertical and plan section. The spring-eye body 28 according to this variant has a bent shape, i.e., the axis of the spring-eye is to one side of the leaf spring end-section 20. This spring-eye body 28 is also composed of fiber reinforced plastic, e.g., glass fiber reinforced epoxy resin, and preferably it is manufactured in the same manner as the spring-eye body 15 described with the aid of FIGS. 3 and 4.

The spring-eye body 28 has a layer 29 on a center section 31 looping a spring-eye bushing 30, and two connecting sections 32 adjoining the two front surfaces of the leaf spring body's end-section 20. Due to the bent shape of the spring-eye body 28, a hollow groove 33 is formed only at one of the transitions from the center section 31 to the connecting sections 32, to which one reinforcing element 34 composed of a bent piece of steel plate is closely joined; the other reinforcing element 34' is composed of a simple steel clamp. The attachment of the spring-eye body 28 to the leaf spring body's end-section is effected as described with the aid of FIGS. 3 and 4.

The plastic leaf spring according to the invention can be used successfully in motor vehicle construction. Its advantage over known plastic leaf springs is demonstrated especially when the forces and/or peak loads introduced by way of the spring-eyes may also have substantial components in the direction of the spring's longitudinal extension.

We claim:

1. A plastic leaf spring with at least one spring-eye section of fiber-reinforced plastic having a spring-eye opening and being arranged at one of the spring ends, which comprises a layer (2,16,29) of essentially constant thickness, with a center section (4,18,31) looping the spring-eye opening (6) and two connecting sections (3,17,32) appropriately essentially parallel to each other, with the latter appropriately forming at least part of the spring end, and with the outer surface of the layer (2,16,29) forming a hollow groove (13,24,33) at least at one transition between its center section (4,18,31) and the connecting section (3,17,32), wherein at least at one of said spring-eye sections two reinforcing elements (11,22,34) made of steel and separated from each other are provided, which outwardly adjoin these connecting section (3,17,32) under pressure, and of which at least one thereby having a rounded edge with which it touches the layer surface at the said hollow groove (13,24,33), and which are connected to each other in a form locking manner.

2. A leaf spring according to claim 1, wherein the reinforcing elements (11, 22, 34) are in plate-shaped form.

3. A leaf spring according to claim 1 or 2, wherein at least one of the reinforcing elements (11, 22) closely joins with a rounded-off edge (12, 24), the connecting hollow groove (11, 22) formed on the layer-surface.

4. A leaf spring according to claim 1, wherein the reinforcing elements (11, 22, 34) are connected to each other and to the spring end by means of screw bolts (14, 25).

5. A leaf spring according to claim 1, wherein the spring-eye section (1) is constructed in one piece with the plastic leaf spring.

6. A leaf spring according to claim 5, wherein the connecting sections (3) of the layer (2) of the spring-eye section (1) wrapping the spring-eye opening (6) are connected to one another and thereby form at least a part of the plate-shaped spring end.

7. A leaf spring according to claim 1 wherein the spring-eye section is a spring-eye body (15,28) constructed as a body separate from the leaf spring body, and which is connected to the spring end.

8. A leaf spring according to claim 7, wherein both connecting sections (17, 32) of the layer (16, 29) of the spring-eye body (15, 28) wrapping the spring-eye opening (18, 28) adjoin the two plane surfaces of the spring end and are connected to the spring end together with the reinforcing elements (22, 34).

* * * * *